US009547349B2

(12) United States Patent
Sato et al.

(10) Patent No.: US 9,547,349 B2
(45) Date of Patent: Jan. 17, 2017

(54) POWER MANAGEMENT SYSTEM, POWER MANAGEMENT APPARATUS, AND DISPLAY CONTROL METHOD

(71) Applicant: KYOCERA CORPORATION, Kyoto (JP)

(72) Inventors: Hirotaka Sato, Yokohama (JP); Kenta Okino, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 385 days.

(21) Appl. No.: 14/348,027

(22) PCT Filed: Sep. 24, 2012

(86) PCT No.: PCT/JP2012/074406
§ 371 (c)(1),
(2) Date: Mar. 27, 2014

(87) PCT Pub. No.: WO2013/047444
PCT Pub. Date: Apr. 4, 2013

(65) Prior Publication Data
US 2014/0244054 A1 Aug. 28, 2014

(30) Foreign Application Priority Data

Sep. 28, 2011 (JP) .................. 2011-213577

(51) Int. Cl.
*G05D 3/12* (2006.01)
*G06F 1/26* (2006.01)
(Continued)

(52) U.S. Cl.
CPC . *G06F 1/26* (2013.01); *H02J 3/14* (2013.01); *H02J 3/383* (2013.01); *H02J 3/387* (2013.01);
(Continued)

(58) Field of Classification Search
CPC .......................................... G06F 1/26
(Continued)

(56) References Cited

U.S. PATENT DOCUMENTS 7,532,987 B2 * 5/2009 Matsubayashi ... H01M 8/04604
429/432
2005/0048337 A1 * 3/2005 Matsubayashi ... H01M 8/04604
702/60
(Continued)

FOREIGN PATENT DOCUMENTS

JP 2007-228696 A 9/2007
JP 2007-295680 A 11/2007
(Continued)

OTHER PUBLICATIONS

LaMarche, Janelle, et al. "Home energy management products & trends." Fraunhofer Center for Sustainable Energy Systems (2011). pp. 1-11.*
(Continued)

*Primary Examiner* — Satish Rampuria
(74) *Attorney, Agent, or Firm* — Procopio Cory Hargreaves and Savitch LLP

(57) ABSTRACT

An HEMS 500 that performs a power management in a consumer 1 that includes one or more loads 40 that consume power and an SOFC unit 100 that performs a load following operation calculates, for each time zone, predicted power consumption, and thereafter, displays information indicating an exceeding time zone in which the predicted power consumption in the consumer exceeds a first threshold value of the SOFC unit 100 and information indicating a non-exceeding time zone in which the predicted power consumption falls short of a second threshold value.

9 Claims, 4 Drawing Sheets

(51) Int. Cl.
*H02J 3/14* (2006.01)
*H02J 3/38* (2006.01)

(52) U.S. Cl.
CPC ........... *Y02B 70/3225* (2013.01); *Y02E 10/563* (2013.01); *Y04S 20/222* (2013.01)

(58) Field of Classification Search
USPC ................................................. 700/286–306
See application file for complete search history.

(56) References Cited

U.S. PATENT DOCUMENTS

| | | | |
|---|---|---|---|
| 2006/0188764 A1* | 8/2006 | Nakamura | H01M 8/04223 700/292 |
| 2010/0235007 A1* | 9/2010 | Constien | G01R 31/3679 700/291 |
| 2011/0153100 A1* | 6/2011 | Besore | G06Q 50/06 700/291 |

FOREIGN PATENT DOCUMENTS

| | | |
|---|---|---|
| JP | 2007-306661 A | 11/2007 |
| JP | 2011-067020 A | 3/2011 |

OTHER PUBLICATIONS

Kiliccote, S., et al. "Open automated demand response for small commercial buildings." LNBL-2195E, Lawrence Berkeley National Laboratory, Berkeley, CA (2009). pp. 1-101.*
International Search Report; PCT/JP2012/074406; Dec. 18, 2012.

* cited by examiner

POWER MANAGEMENT SYSTEM, POWER MANAGEMENT APPARATUS, AND DISPLAY CONTROL METHOD

TECHNICAL FIELD

The present invention relates to a power management system, a power management apparatus, and a display control method for performing a power management in a consumer having a fuel cell unit.

BACKGROUND ART

In recent years, in a power consumer (house, etc.), a fuel cell unit provided with a fuel cell and a power conversion equipment (power conditioner) is becoming popular as an auxiliary power source for a commercial power grid.

Further, Patent Literature 1 discloses a technology of displaying a message prompting to ventilate a room when a temperature in a room where an air conditioner is provided is lower than an outdoor air temperature.

CITATION LIST

Patent Literature

Patent Literature 1: Japanese Patent Application Publication No. 2011-67020

SUMMARY OF THE INVENTION

The technology described in Patent Literature 1 is for performing a display to promote reduction of power consumption; however, does not perform a display on the basis of the nature of a fuel cell unit.

Therefore, there is a problem that, in a consumer having a fuel cell unit, it is impossible to promote the improvement in power generation efficiency of a fuel cell unit.

Therefore, it is an object of the present invention to provide a power management system, a power management apparatus, and a display control method capable of promoting the improvement in power generation efficiency of a fuel cell unit.

A power management system according to the embodiment of the present invention performs a power management in a consumer that includes one or more loads that consume power and a fuel cell unit that performs a load following operation. The power management system comprises: a display unit; and a control unit that controls the display unit, and the control unit controls the display unit to display information indicating a first time zone in which predicted power consumption in the consumer exceeds a first threshold value and information indicating a second time zone in which the predicted power consumption falls short of a second threshold value.

According to another feature of the present invention, the first threshold value is a value equal to or more than the rated output power of the fuel cell unit and the second threshold value is a value equal to or less than the rated output power of the fuel cell unit.

According to another feature of the present invention, the power management system further comprises a storage unit that stores a past record of the power consumption in the consumer, and the control unit calculates, for each time zone, the predicted power consumption, on the basis of the past record of the power consumption.

According to another feature of the present invention, the control unit further calculates, for each time zone, an exceeding amount of the predicted power consumption relative to the first threshold value or a surplus of the predicted power consumption relative to the second threshold value, and thereafter, controls the display unit to display information indicating the exceeding amount in the first time zone and information indicating the surplus in the second time zone.

According to another feature of the present invention, the control unit acquires predicted output power information of another power generation unit provided in the consumer, and the control unit further controls the display unit so that the predicted output power information is displayed in association with information indicating the first time zone.

According to another feature of the present invention, the control unit further predicts availability or unavailability of power selling for each time zone on the basis of the predicted output power information, and thereafter, controls the display unit so that the information indicating the first time zone is displayed in association with information on the predicted availability or unavailability of the power selling.

According to another feature of the present invention, the storage unit stores the past record of the power consumption for each load provided in the consumer, and the control unit further calculates the predicted power consumption for each time zone, for each load, and thereafter, controls the display unit to display information indicating a load that should be stopped from being used in the first time zone and/or information indicating a load that should be used in the second time zone, on the basis of the predicted power consumption calculated for each load.

According to another feature of the present invention, the storage unit stores the past record of the power consumption for each room provided in the consumer, and the control unit further calculates the predicted power consumption for each time zone, for each room, and thereafter, controls the display unit to display information indicating a room where a load should be stopped from being used in the first time zone and/or information indicating a room where the load should be used in the second time zone, on the basis of the predicted power consumption calculated for each room.

A display control method according to the embodiment of the present invention performs a power management in a consumer that includes one or more loads that consume power and a fuel cell unit that performs a load following operation. The display control method comprises: a step of calculating predicted power consumption for each time zone in the consumer; and a step of controlling a display unit to display information indicating a first time zone in which the predicted power consumption exceeds a first threshold value of the fuel cell unit and information indicating a second time zone in which the predicted power consumption falls short of a second threshold value. The first and second threshold values are set according to rated output power of the fuel cell unit.

A power management apparatus according to the embodiment of the present invention performs a power management in a consumer that includes one or more loads that consume power and a fuel cell unit that performs a load following operation. The power management apparatus comprises: a display unit; and a control unit that controls the display unit. The control unit controls the display unit to display information indicating a first time zone in which predicted power consumption in the consumer exceeds a first threshold value and information indicating a second time zone in which the predicted power consumption falls short of a second threshold value. The control unit sets the first and second threshold values according to rated output power of the fuel cell unit.

According to the present invention, it is possible provide a power management system, power management apparatus and display control method capable of promoting the improvement in power generation efficiency of a fuel cell unit.

DESCRIPTION OF THE EMBODIMENT

Figure 1:
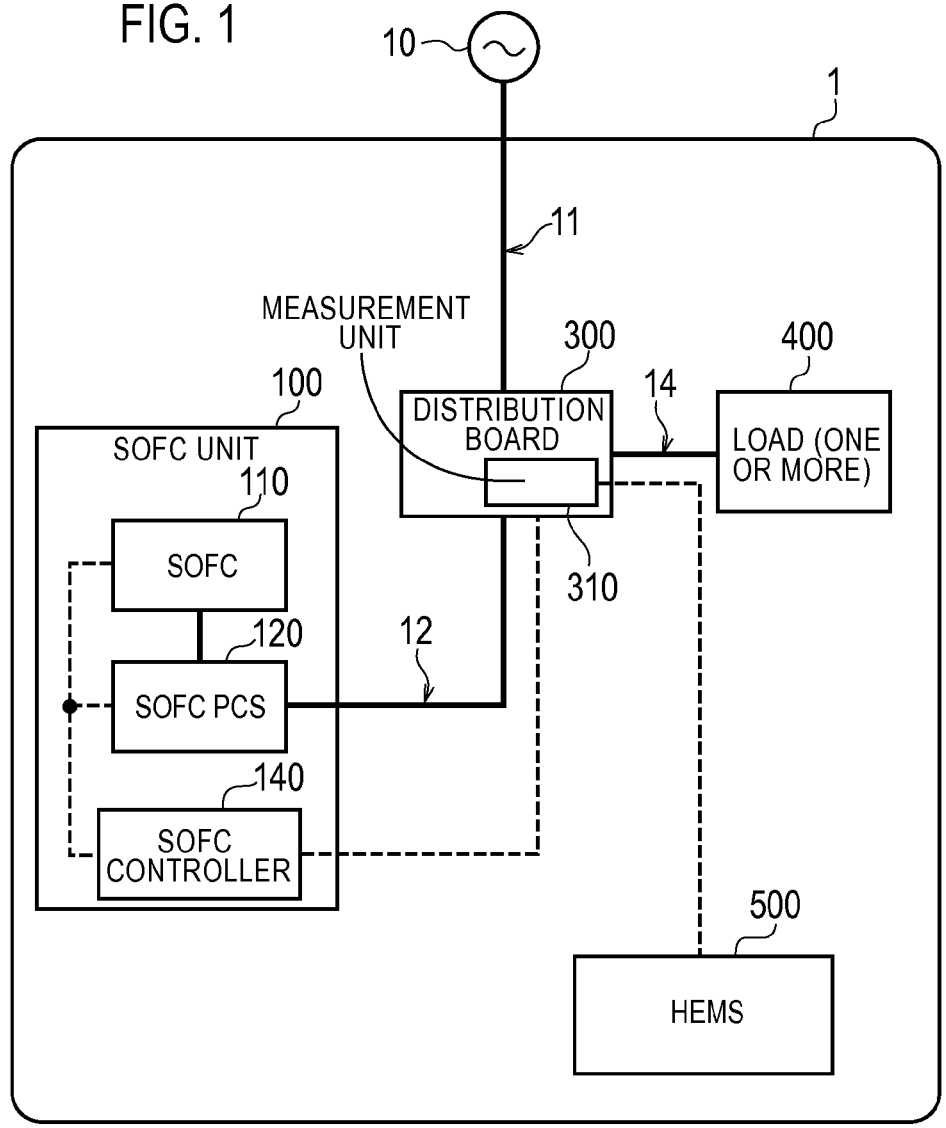
FIG. 1 is a block diagram of a power system according to the embodiment of the present invention.

With reference to the drawings, the embodiment of the present invention will be described. In the drawings of the following embodiments, the same or similar reference signs are applied to the same or similar portions.

FIG. 1 is a block diagram of a power system according to the present embodiment. In FIG. 1, a bold line indicates a power line and a dashed line indicates a control line. The control line may be wireless.

As shown in FIG. 1, the power system according to the present embodiment includes a solid oxide fuel cell (SOFC) unit 100, a distribution board 300, one or a plurality of loads 400, and a home energy management system (HEMS) 500. The SOFC unit 100, the distribution board 300, the load 400, and the HEMS 500 are provided in a consumer with which alternating-current power (AC power) is supplied from a commercial power grid (hereinafter, "grid") 10. The SOFC unit 100 is interconnected with the grid 10. In the present embodiment, the SOFC unit 100 corresponds to a fuel cell unit that performs a load following operation in which output power is increased or decreased in accordance with an increase or decrease in the power consumption by the load 400. Further, the HEMS 500 corresponds to a power management system or a power management apparatus for performing a power management in a consumer 1.

The SOFC unit 100 includes an SOFC 110, an SOFC power conditioner (PCS) 120, and an SOFC controller 140. The SOFC 110 is a type of fuel cell and generates power by a chemical reaction between hydrogen extracted from natural gas or the like and oxygen in the air to output the generated direct-current (DC) power. An amount of power generated by the SOFC 110 varies depending on an amount of gas and air input to the SOFC 110. The amount of gas and air is controlled by the SOFC controller 140. The SOFC PCS 120, to which the DC power output by the SOFC 110 is input, converts the input DC power into AC power, and outputs the AC power to the distribution board 300 via an SOFC power line 12. The SOFC controller 140 performs control for performing a load following operation. In the present embodiment, the SOFC controller 140 decides a target output power of the SOFC unit 100 so that a measured value of power buying from the grid 10 reaches a predetermined value (for example, zero), and controls the SOFC 110 so that the output power of the SOFC unit 100 reaches the target output power. Alternatively, the SOFC controller 140 may decide the target output power equal to the measured value of the power consumption by the load 400, and control the SOFC 110 so that the output power of the SOFC unit 100 reaches the target output power.

The distribution board 300 is connected to a system power line 11, an SOFC power line 12, and a load power line 14. The distribution board 300 distributes the power buying from the grid 10 and the power output from the SOFC unit 100 to the load 400. In the present embodiment, the distribution board 300 includes a measurement unit 310 that periodically measures the power buying from the grid 10 and the power consumption by the load 400. The measurement unit 310 outputs the measured value to the SOFC controller 140 via a control line between the measurement unit 310 and the SOFC controller 140. Further, the measurement unit 310 outputs the measured value to the HEMS 500 via a control line between the measurement unit 310 and the HEMS 500.

The load 400, to which the AC power is input from the distribution board 300 via the load power line 14, operates by consuming the input AC power. Examples of the load 400 include a home appliance such as lighting, an air conditioner, a refrigerator, and TV.

Figure 2:
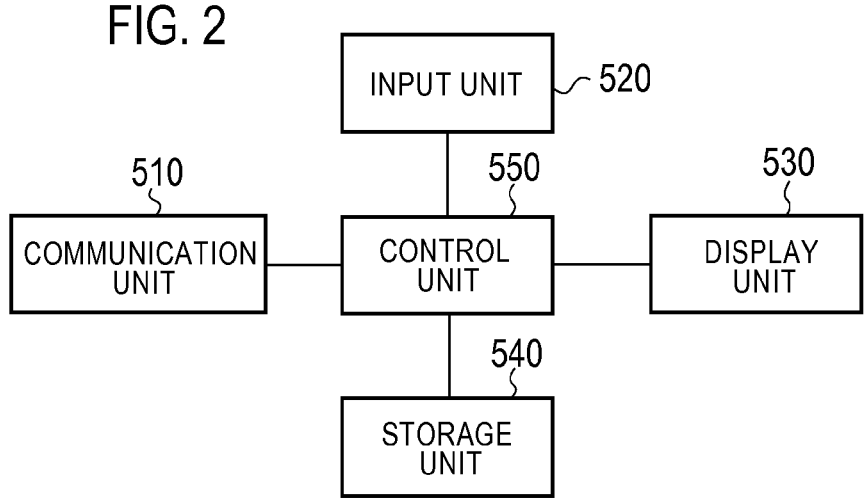
FIG. 2 is a block diagram of the HEMS according to the embodiment of the present invention.

The HEMS 500 manages and displays a record of the power consumption by the load 400. Further, the HEMS 500 may perform power-saving control on the load 400. FIG. 2 is a block diagram of the HEMS 500. As shown in FIG. 2, the HEMS 500 includes a communication unit 510, an input unit 520, a display unit 530, a storage unit 540, and a control unit 550. The communication unit 510 communicates with each equipment provided in the consumer 1. The input unit 520 receives an operation input from a resident. The display unit 530 performs various displaying. The input unit 520 and the display unit 530 may be integrated as a touch panel.

The storage unit 540 is configured by a memory, etc., and stores various types of information used for control in the control unit 550. Further, the storage unit 540 stores a past record of the power consumption in the consumer 1. In particular, the control unit 550 controls the storage unit 540 so that the measured value of the power consumption by a load which is received by the communication unit 510 is stored in association with time information. The storage unit 540 stores rated output power (that is, maximum output power) of the SOFC unit 100. The rated output power is employed as a threshold value (first threshold value and/or a second threshold value) that is compared with a predicted power consumption for each time zone in the consumer 1. The control unit 550 sets the first threshold value to a value equal to or more than the rated output power, and sets the second threshold value to a value equal to or less than the rated output power.

In the present embodiment, the following description will be given of a case where the first threshold value and the second threshold value are the rated output power, respectively; however, the first threshold value and the second threshold value may be set as a different value according to the above-described definition. In this case, in the following description, the "rated output power" in a case where an "exceeding time zone" is defined should be regarded as the "first threshold value", and the "rated output power" in a case where a "non-exceeding time zone" is defined should be regarded as the "second threshold value". Next, a method of calculating the predicted power consumption for each time zone in the consumer 1 will be described.

The control unit 550 is configured by a processor, etc., and controls various functions of the HEMS 500. The control unit 550 calculates the predicted power consumption for each time zone in the consumer 1 on the basis of the past record of the power consumption stored in the storage unit 540. Then, on the basis of the calculated predicted power consumption for each time zone, the control unit 550 controls the display unit 530 so as to display information indicating a time zone in which the predicted power consumption exceeds the rated output power of the SOFC unit 100 (hereinafter, "exceeding time zone") and information indicating a time zone in which the predicted power consumption falls short of the rated output power (hereinafter, "non-exceeding time zone").

Figure 3:
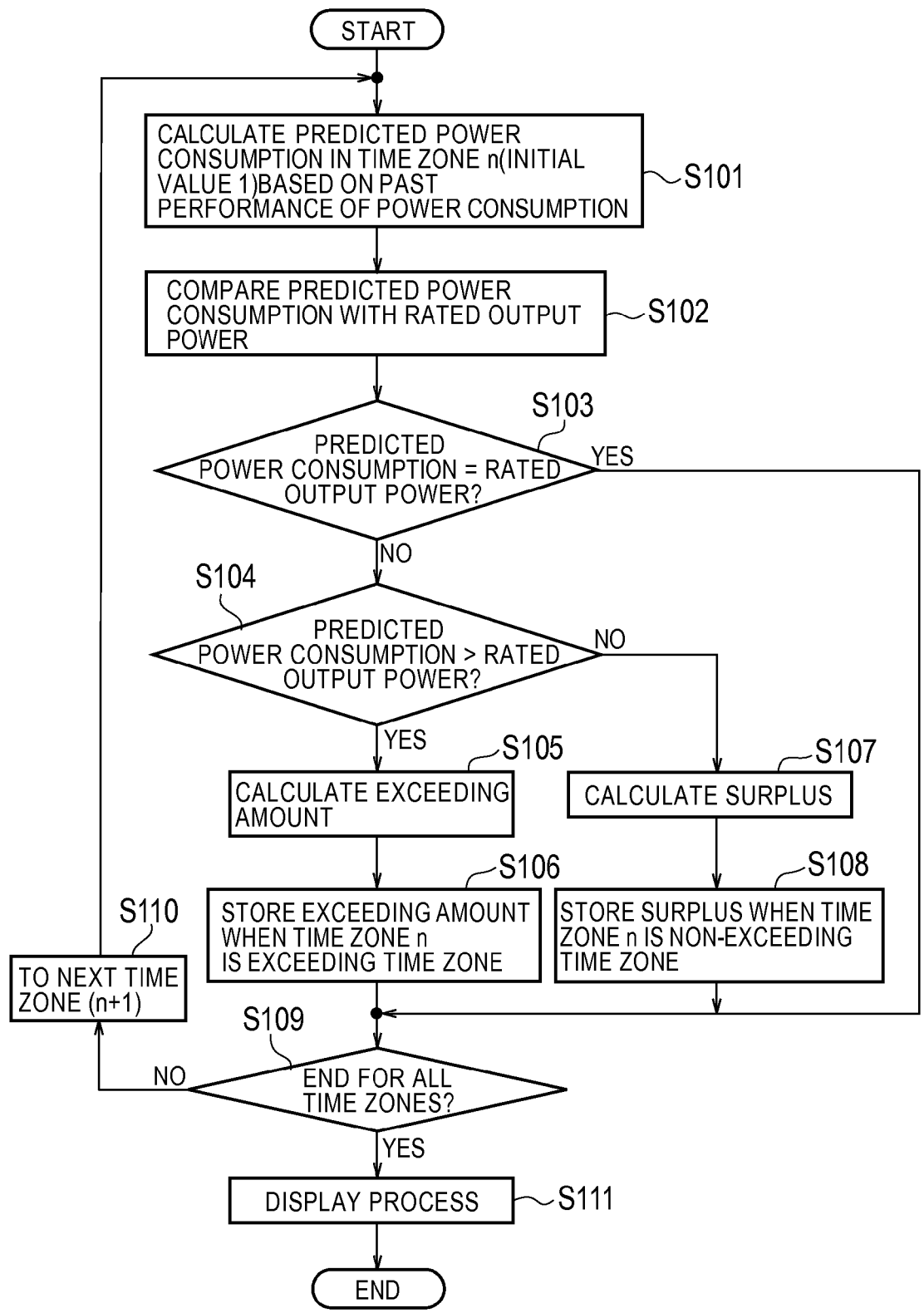
FIG. 3 is an operation flow chart of the HEMS 500 according to the embodiment of the present invention.

Next, an operation of the HEMS 500 according to the present embodiment will be described. FIG. 3 is an operation flow chart of the HEMS 500 according to the present embodiment. The HEMS 500 periodically executes the present flow (for example, once a day).

As shown in FIG. 3, in step S101, the control unit 550 calculates the predicted power consumption for a time zone n, on the basis of the past record of the power consumption. An initial value of n is 1, and an index value of the time zone is stored beforehand in the storage unit 540. A time length of the time zone, etc., may be set by the resident by using the input unit 520.

For example, the control unit 550 calculates an average of the measured values of the power consumption by a load corresponding to the time zone n, and sets the average value as the predicted power consumption. Alternatively, a representative value (such as a mean value) other than the average value may be calculated. Further, a weighted average in which the weight of a recent measured value is increased may be calculated.

In step S102, the control unit 550 compares the predicted power consumption calculated for the time zone n with the rated output power of the SOFC unit 100. The rated output power of the SOFC unit 100 is stored beforehand in the storage unit 540. The rated output power may be input by the resident by using the input unit 520, and may be acquired through communication between the HEMS 500 and the SOFC controller 140.

In step S103, the control unit 550 checks whether or not the predicted power consumption calculated for the time zone n is equal to the rated output power of the SOFC unit 100. When not equal, the process advances to step S104, and when equal, the process advances to step S109.

In step S104, the control unit 550 checks whether or not the predicted power consumption calculated for the time zone n exceeds the rated output power of the SOFC unit 100. When the predicted power consumption exceeds the rated output power, the process advances to step S105, and when not exceed the rated output power, the process advances to step S107.

In step S105, the control unit 550 calculates an exceeding amount of the predicted power consumption relative to the rated output power of the SOFC unit 100 by subtracting the rated output power of the SOFC unit 100 from the predicted power consumption calculated for the time zone n. The control unit 550 may calculate an exceeding amount of the predicted power consumption relative to the rated output power of the SOFC unit 100 by subtracting a value (first predetermined value) that exceeds the rated output power of the SOFC unit 100 from the predicted power consumption calculated for the time zone n. Then, in step S106, the control unit 550 controls so that the storage unit 540 stores information indicating that the time zone n is the exceeding time zone and information on the exceeding amount in the time zone n.

On the other hand, in step S107, the control unit 550 calculates a surplus of the predicted power consumption relative to the rated output power of the SOFC unit 100 by subtracting the predicted power consumption calculated for the time zone n from the rated output power of the SOFC unit 100. The control unit 550 may calculate a surplus of the predicted power consumption relative to the rated output power of the SOFC unit 100 by subtracting the predicted power consumption calculated for the time zone n from a value (second predetermined value) that falls short of the rated output power of the SOFC unit 100. Then, in step S108, the control unit 550 controls so that the storage unit 540 stores information indicating that the time zone n is the non-exceeding time zone and information on the surplus in the time zone n.

Next, in step S109, the control unit 550 checks whether or not the processes for all the time zones are completed. When the processes for all the time zones are completed, the process advances to step S111, and when not completed, the process advances to step S110. In step S110, the control unit 550 increments n, and a process for a next time zone is performed again from step S101.

On the other hand, in step S111 after the processes for all the time zones are completed, the control unit 550 controls the display unit 530 to display the exceeding information (the exceeding time zone and the exceeding amount) and surplus information (the non-exceeding time zone and the surplus) stored in the storage unit 540. In this case, the control unit 550 may perform a display for advising transfer of the power consumption in the exceeding time zone to the non-exceeding time zone.

Figure 4:
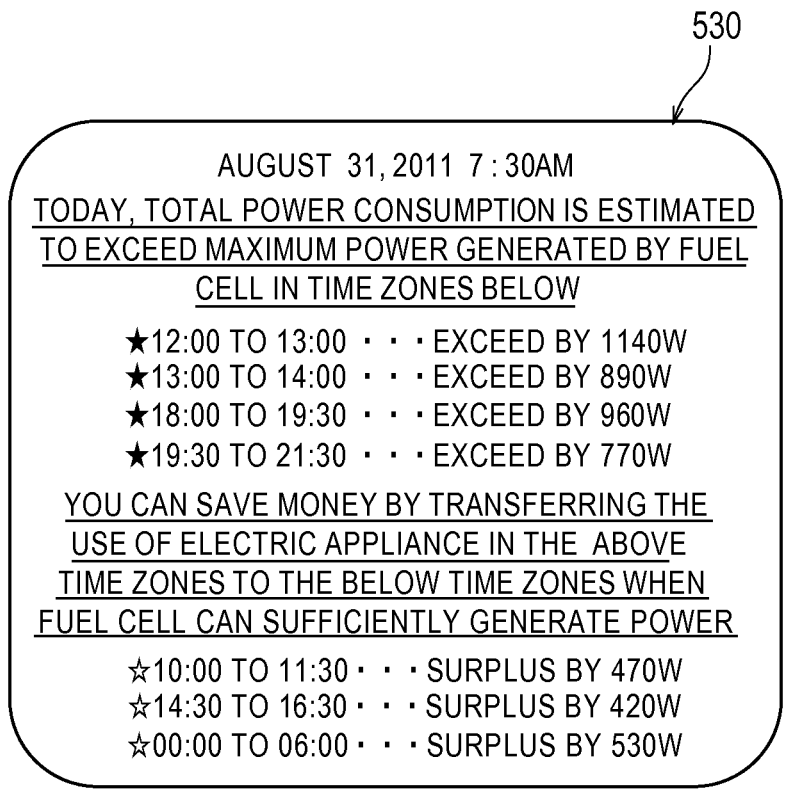
FIG. 4 is a diagram for explaining a screen display example of the display unit according to the embodiment of the present invention.

FIG. 4 is a diagram for explaining a screen display example of the display unit 530. FIG. 4 shows an example in which the control unit 550 performs display control by calculating predicted power consumption for each time zone on a certain day in the morning (7:30 AM).

As shown in FIG. 4, the display unit 530 displays an indication that each of the time zones, 12:00 to 13:00, 13:00 to 14:00, 18:00 to 19:30, and 19:30 to 21:30, is the exceeding time zone, and the exceeding amount to be associated with each of the time zones. Further, the display unit 530 displays an indication that each of the time zones, 10:00 to 11:30, 14:30 to 16:30, and 00:00 to 06:00, is the non-exceeding time zone, and the surplus to be associated with each of the time zones. Further, the control unit 530 displays an indication to advise the transfer of the power consumption (use of equipment) in the exceeding time zone to the non-exceeding time zone.

The display unit 530 may display the power buying from the grid 10 and the power consumption by the load 400. Further, the screen display of the display unit 530 may be configured as GUI (Graphical User Interface) by using a graph or an icon, for example.

Further, the resident may input, by an operation on the input unit 520, information on the power consumption (use of equipment) to be transferred from the exceeding time zone to the non-exceeding time zone. At this time, the display unit 530 may display the predicted power consumption for each time zone changed as a result of the transfer of the power consumption.

As described above, the HEMS 500 for performing the power management in the consumer 1 including one or more loads 400 that consume power and the SOFC unit 100 that performs the load following operation, includes: the display unit 530; the control unit 550 that controls the display unit 530; and the storage unit 540 that stores the past record of the power consumption in the consumer 1. After calculating predicted power consumption for each time zone in the consumer 1 on the basis of the past record of the power consumption, the control unit 550 controls the display unit 530 to display the information indicating an exceeding time zone in which the predicted power consumption exceeds the rated output power of the SOFC unit 100 and the information indicating a non-exceeding time zone in which the predicted power consumption falls short of the rated output power.

Thus, the HEMS 500 displays the information indicating a time zone (exceeding time zone) in which the predicted power consumption calculated on the basis of the past record of the power consumption exceeds the rated output power of the SOFC unit 100 and the information indicating the time zone (non-exceeding time zone) in which the predicted power consumption does not exceed the rated output power. The SOFC unit 100 achieves the highest power generation efficiency when operating at the rated output power. Therefore, when the resident is informed of the exceeding time zone and the non-exceeding time zone, it is possible to raise awareness of the resident to operate the SOFC unit 100 at the rated output power. Therefore, it is possible for the consumer 1 provided with the SOFC unit 100 to promote the improvement in power generation efficiency of the SOFC unit 100.

Further, after calculating, for each time zone, the exceeding amount or the surplus of the predicted power consumption relative to the rated output power on the basis of the past record of the power consumption, the control unit 550 controls the display unit 530 to display the information indicating the exceeding amount in the exceeding time zone and the information indicating the surplus in the non-exceeding time zone. As a result, the resident becomes aware of how large the exceeding amount or the surplus is, and thus, it is possible to more specifically prompt the resident to operate the SOFC unit 100 at the rated output power.

[First Modification]

Figure 5:
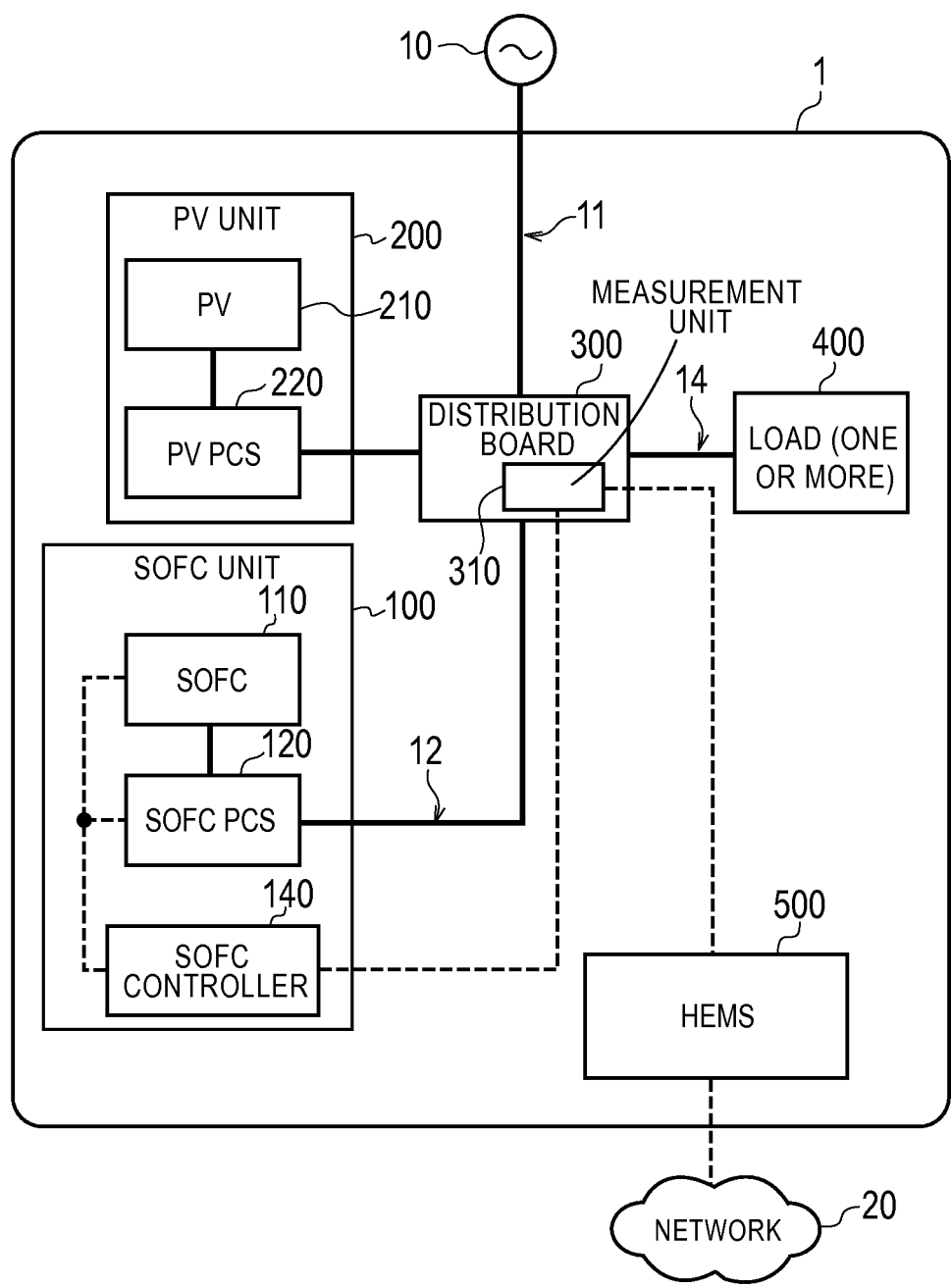
FIG. 5 is a block diagram of the power system according to the first modification of the embodiment of the present invention.

Next, a first modification according to the above-described embodiment will be described. FIG. 5 is a block diagram of the power system according to the present modification. In FIG. 5, a bold line indicates a power line and a dashed line indicates a control line. The control line may be wireless.

As shown in FIG. 5, the power system according to the present modification differs from the above-described embodiment in that the consumer 1 further includes a PV unit 200 including a photovoltaic cell (PV) 210 and a PV PC 220.

The power system according to the present modification is configured such that two power generation units, the SOFC unit 100 and the PV unit 200, are used concurrently. Each of the SOFC unit 100 and the PV unit 200 is interconnected with the grid 10. It is possible to sell the output power of the PV unit 200 to the grid 10, and thus, it is preferable that the output power of the PV unit 200 is sold to the grid 10 as much as possible rather than supplied to the load 400.

In the present modification, the control unit 550 acquires information (hereinafter, "predicted output power information") indicating power predicted to be generated for each time zone, by the PV unit 200 in a predetermined period (for example, per day) in the future. The predicted output power information is supplied from a service center, etc., connected to the network 20, to the HEMS 500 in the consumer 1. In this case, the HEMS 500 may supply beforehand local information, etc., around the consumer 1, as element information needed when the predicted output power information is created at a service center, etc. Further, the control unit 550 may acquire the predicted output power information by acquiring information (hereinafter, "weather information") on weather (for example, an amount of solar radiation) in a region of the consumer 1 on a particular day, from the network 20, and predicting the output power of the PV unit 200 from the acquired weather information. Then, after predicting the availability or unavailability of power selling for each time zone on the basis of the predicted output power information, in addition to the above-described operation flow, the control unit 550 controls the display unit 530 to display the information indicating the above-described exceeding time zone in association with the information on the predicted availability or unavailability of the power selling (step S111). In the availability or unavailability of the power selling, when a total value of the predicted output power of the PV unit 200 and the rated output power of the SOFC unit 100 is greater than the predicted power consumption by the load 400, the availability of the power selling is predicted, and when equal to or less than the predicted power consumption by the load 400, the unavailability of the power selling is predicted.

For example, in the display example of FIG. 4, when the availability of the power selling is predicted in the exceeding time zone between 12:00 and 13:00, the control unit 550 controls the display unit 530 to display that the availability of the power selling is predicted in the time zone. This can inform the resident that it is possible to operate the SOFC unit 100 with a high power generation efficiency and to maximize the amount of power selling to the grid 10 by decreasing the power consumption (use of equipment) in the time zone down to the SOFC rated output power. In this case, the control unit 550 may control the display unit 530 to display (advise) that it is possible to operate the SOFC unit 100 with a high power generation efficiency and maximize the amount of power to be sold to the grid 10.

Further, when the availability of the power selling in the exceeding time zone between 12:00 and 13:00 is predicted, it is possible to inform the resident that it is possible to increase the amount of power selling and to improve the power generation efficiency of the SOFC unit 100 by transferring the power consumption in the time zone to the non-exceeding time zone. In this case, the control unit 550 may control the display unit 530 to display (advise) it is possible to increase the amount of power to be sold and to improve the power generation efficiency of the SOFC unit 100 by transferring the power consumption in the time zone to the non-exceeding time zone.

In the present modification, the control unit 550 predicts the availability or unavailability of the power selling for each time zone on the basis of the predicted output power information; however, the control unit 550 may predict the availability or unavailability of the power buying and selling for each time zone on the basis of the past record of the power buying and selling from the PV unit 200 to the grid 10.

[Second Modification]

Next, a second modification according to the above-described embodiment will be described.

In the present modification, the storage unit 540 stores a past record of the power consumption, for each load 400 provided in the consumer 1. See Japanese Patent Application Publication No. 2011-120324 for a method of measuring the power consumption for each load.

The control unit 550 calculates the predicted power consumption for each time zone, for each load 400, in the above-described operation flow, and then, controls (step S111) the display unit 530 to display information indicating the load 400 that should be stopped from being used in the exceeding time zone, on the basis of the predicted power consumption calculated for each load 400. For example, the control unit 550 accumulates the predicted power consumption for each load 400 in ascending order of the priority (degree of importance) set beforehand to each load 400, decides the load 400 the accumulated value for which is equal to or less than the exceeding amount relative to the rated output power, to be stopped from being used, and controls the display unit 530 to display a name of the load 400.

Further, the control unit 550 calculates the predicted power consumption for each time zone, for each load 400, in the above-described operation flow, and then, controls (step S111) the display unit 530 to display information indicating the load 400 that should be used in the non-exceeding time zone, on the basis of the predicted power consumption calculated for each load 400. For example, the control unit 550 accumulates the predicted power consumption for each load 400 in descending order of the priority (degree of importance) set beforehand to each load 400, decides the load 400 the accumulated value for which is equal to or less than the surplus relative to the rated output power, to be used, and controls the display unit 530 to display a name of the load 400.

A similar process may be performed for each group of loads (for example, for each room) as well as the above-described process for each load.

In this case, the control unit 550 calculates the predicted power consumption for each time zone, for each room, in the above-described operation flow, and then, controls (step S111) the display unit 530 to display information indicating a room where the load should be stopped from being used in the exceeding time zone, on the basis of the predicted power consumption calculated for each room. For example, the control unit 550 accumulates the predicted power consumption for each room in ascending order of the priority (degree of importance) set beforehand to each room, decides the room the accumulated value for which is equal to or less than the exceeding amount relative to the rated output power, to be the room where the load should be stopped from being used, and controls the display unit 530 to display a name of the room.

Further, the control unit 550 calculates the predicted power consumption for each time zone, for each room, in the above-described operation flow, and then, controls (step S111) the display unit 530 to display information indicating a room where the load should be used in the non-exceeding time zone, on the basis of the predicted power consumption calculated for each room. For example, the control unit 550 accumulates the predicted power consumption for each room in descending order of the priority (degree of importance) set beforehand to each room, decides the room the accumulated value for which is equal to or less than the surplus relative to the rated output power, to be the room where the load should be used, and controls the display unit 530 to display a name of the room.

[Other Embodiments]

As described above, the present invention has been described according to the embodiment. It must not be understood that, however, the discussions and the drawings constituting a part of this disclosure limit the present invention. From this disclosure, various alternative embodiments, examples and operational techniques are apparent to those skilled in the art.

For example, in the above-described embodiment, the HEMS that is an energy management system (EMS) provided in a house is described as one example of the power management system according to the present invention; however, the configuration may be such that the display unit 530 is provided inside the house and the control unit 550 is provided outside the house (in a server, for example).

Further, in the embodiment, as the apparatus in which the control unit 550 is provided, the HEMS is used as an example; however, the present invention is not limited thereto. For example, the control unit 550 may be provided in a BEMS (Building and Energy Management System) or an FEMS (Factory Energy Management System).

Further, as the fuel cell, the SOFC is described as an example; however, a fuel cell of another type such as a PEFC may be used.

As described above, it must be understood that the present invention includes various embodiments and the like that are not described herein.

Note that the entire content of the Japanese Patent Application No. 2011-213577 (filed on Sep. 28, 2011) is incorporated herein by reference.

INDUSTRIAL APPLICABILITY

According to the present invention, it is possible provide a power management system, power management apparatus and display control method capable of promoting the improvement in power generation efficiency of a fuel cell unit.

The invention claimed is:

1. A power management system that performs a power management in a consumer that includes one or more loads that consume power and a fuel cell unit that performs a load following operation, comprising:
a display unit; and
a control unit that controls the display unit,
wherein
the control unit controls the display unit to display information indicating a first time zone in which predicted power consumption in the consumer exceeds a first threshold value, and information indicating a second time zone in which the predicted power consumption falls short of a second threshold value,
the control unit sets the first and second threshold values according to rated output power of the fuel cell unit,
the control unit predicts availability or unavailability of power selling for each time zone on the basis of the predicted output power information, and
the control unit controls the display unit to display the information indicating the first time zone in association with information on the predicted availability or unavailability of the power selling.

2. The power management system according to claim 1, wherein the first threshold value is a value equal to or more than the rated output power of the fuel cell unit and the second threshold value is a value equal to or less than the rated output power of the fuel cell unit.

3. The power management system according to claim 2, further comprising:
a storage unit that stores a past record of the power consumption in the consumer, wherein the control unit calculates, for each time zone, the predicted power consumption, on the basis of the past record of the power consumption.

4. The power management system according to claim 3, wherein the control unit further calculates, for each time zone, an exceeding amount of the predicted power consumption relative to the first threshold value or a surplus of the predicted power consumption relative to the second threshold value, and thereafter, controls the display unit to display information indicating the exceeding amount in the first time zone and information indicating the surplus in the second time zone.

5. The power management system according to claim 4, wherein the control unit acquires predicted output power information of another power generation unit provided in the consumer, and the control unit further controls the display unit so that the predicted output power information is displayed in association with information indicating the first time zone.

6. The power management system according to claim 3, wherein the storage unit stores the past record of the power consumption for each load provided in the consumer, and the control unit further calculates the predicted power consumption for each time zone, for each load, and thereafter, controls the display unit to display information indicating a load that should be stopped from being used in the first time zone and/or information indicating a load that should be used in the second time zone, on the basis of the predicted power consumption calculated for each load.

7. The power management system according to claim 3, wherein the storage unit stores the past record of the power consumption for each room provided in the consumer, and the control unit further calculates the predicted power consumption for each time zone, for each room, and thereafter, controls the display unit to display information indicating a room where a load should be stopped from being used in the first time zone and/or information indicating a room where the load should be used in the second time zone, on the basis of the predicted power consumption calculated for each room.

8. A display control method of performing a power management in a consumer that includes one or more loads that consume power and a fuel cell unit that performs a load following operation, comprising:

a step of calculating predicted power consumption for each time zone in the consumer; and a step of controlling a display unit to display information indicating a first time zone in which the predicted power consumption exceeds a first threshold value of the fuel cell unit, and information indicating a second time zone in which the predicted power consumption falls short of a second threshold value, wherein the first and second threshold values are set according to rated output power of the fuel cell unit, the control unit predicts availability or unavailability of power selling for each time zone on the basis of the predicted output power information, and the control unit controls the display unit to display the information indicating the first time zone in association with information on the predicted availability or unavailability of the power selling.

9. A power management apparatus that performs a power management in a consumer that includes one or more loads that consume power and a fuel cell unit that performs a load following operation, comprising:

a display unit; and a control unit that controls the display unit, wherein the control unit controls the display unit to display information indicating a first time zone in which predicted power consumption in the consumer exceeds a first threshold value, and information indicating a second time zone in which the predicted power consumption falls short of a second threshold value, the control unit sets the first and second threshold values according to rated output power of the fuel cell unit, the control unit predicts availability or unavailability of power selling for each time zone on the basis of the predicted output power information, and the control unit controls the display unit to display the information indicating the first time zone in association with information on the predicted availability or unavailability of the power selling.

* * * * *